US012308568B2

(12) United States Patent
Sundarakrishnamachari et al.

(10) Patent No.: US 12,308,568 B2
(45) Date of Patent: May 20, 2025

(54) CONNECTOR ASSEMBLY WITH FLEXIBLE LOCK AND EVENT DRIVEN WEDGE

(71) Applicant: Aptiv Technologies AG, Schaffhausen (CH)

(72) Inventors: Rangarajan Sundarakrishnamachari, Chennai (IN); Velmurugan Kandasamy, Salem (IN); Dineshkumar Manoharan, Chennai (IN); John R. Morello, Warren, OH (US)

(73) Assignee: Aptiv Technologies AG, Schaffhausen (CH)

( * ) Notice: Subject to any disclaimer, the term of this patent is extended or adjusted under 35 U.S.C. 154(b) by 397 days.

(21) Appl. No.: 18/092,989

(22) Filed: Jan. 4, 2023

(65) Prior Publication Data

US 2024/0222907 A1 Jul. 4, 2024

(51) Int. Cl.
*H01R 13/62* (2006.01)
*H01R 13/516* (2006.01)
(Continued)

(52) U.S. Cl.
CPC ..... *H01R 13/62933* (2013.01); *H01R 13/516* (2013.01); *H01R 13/6271* (2013.01); *H01R 13/639* (2013.01)

(58) Field of Classification Search
CPC .............. H01R 13/639; H01R 13/6275; H01R 13/6272; H01R 13/629; H01R 2103/00;
(Continued)

(56) References Cited

U.S. PATENT DOCUMENTS 6,171,146 B1 * 1/2001 Fink .................. H01R 13/4223 439/752
6,332,789 B1 * 12/2001 Okabe .............. H01R 13/62933 439/157

(Continued)

FOREIGN PATENT DOCUMENTS

DE 112014003938 B4 2/2018

OTHER PUBLICATIONS

"Extended European Search Report"; European Patent Office; mailed on May 6, 2024; 5 Pages.

*Primary Examiner* — Truc T Nguyen
(74) *Attorney, Agent, or Firm* — Billion & Armitage

(57) ABSTRACT

An electrical connector assembly terminal modules configured to contain electrical terminals connected to one or more electrical cables, an inner module frame in which terminal modules are secured, and an outer housing having cantilevered locking arms with primary surfaces and secondary surfaces on inner sides of the locking arms to secure the inner module frame to the female outer housing. Latch surfaces of the inner module frame engage the primary surfaces when the inner module frame is inserted within the female outer housing. The female outer housing receives a header having side walls surrounding mating electrical terminals. The locking arms define ramp features on outer sides of the locking arms that push the locking arms inwardly when the side walls contact the ramp features of the locking arms as the header is inserted within the outer housing. A method of assembling such an electrical connector is also provided.

15 Claims, 14 Drawing Sheets

(51) Int. Cl.
*H01R 13/627* (2006.01)
*H01R 13/629* (2006.01)
*H01R 13/639* (2006.01)

(58) Field of Classification Search
CPC .............. H01R 13/641; H01R 2201/26; H01R 2107/00
See application file for complete search history.

(56) References Cited

U.S. PATENT DOCUMENTS

| | | | | |
|---|---|---|---|---|
| 6,558,176 | B1 * | 5/2003 | Martin ............. | H01R 13/62944 439/372 |
| 9,847,601 | B2 | 12/2017 | Menard | |
| 2005/0020114 | A1 * | 1/2005 | Denter ............... | H01R 13/6271 439/157 |
| 2005/0026484 | A1 * | 2/2005 | Demuth ............. | H01R 13/6295 439/157 |
| 2008/0233778 | A1 * | 9/2008 | Moll .................. | H01R 13/7032 439/516 |
| 2010/0151714 | A1 * | 6/2010 | Ambo .............. | H01R 13/62955 439/157 |
| 2010/0159734 | A1 * | 6/2010 | Horiuchi ............ | H01R 13/4538 439/374 |
| 2011/0053405 | A1 * | 3/2011 | Kobayashi ....... | H01R 13/62955 439/345 |
| 2014/0065850 | A1 * | 3/2014 | Takamura .......... | H01R 12/7011 439/65 |
| 2014/0242821 | A1 * | 8/2014 | Suzuki ............. | H01R 13/62922 439/157 |
| 2014/0273566 | A1 * | 9/2014 | Allgood ............... | H01R 13/516 439/157 |

* cited by examiner

CONNECTOR ASSEMBLY WITH FLEXIBLE LOCK AND EVENT DRIVEN WEDGE

TECHNICAL FIELD

This application is directed to a connector assembly with a flexible lock and an event driven wedge.

BACKGROUND

Electrical connector assemblies having terminal module frames that are axially loaded into an outer connector housing requires additional clearance between the face of a flexible locking arm of the outer connector housing and the corresponding locking surface of an inner terminal module frame, thereby creating additional axial variation between the outer connector housing the inner terminal module frame, which in turn affects terminal-to-terminal contact overlap of the terminals in the female connector terminal modules and the terminals in a male connector or header pin in the connector assembly. Electrical connector assemblies having terminal modules that are laterally loaded into an outer connector housing reduce the clearance with respect to terminal-to-terminal contact overlap but increases the overall package size of the electrical connector assembly. Flexible locking arms are typically not reinforced so the retention force between the inner terminal module frame and the outer connector housing provided by the flexible locking arms is low.

SUMMARY

According to one or more aspects of the present disclosure, an electrical connector assembly includes a plurality of terminal modules, each configured to contain one or more electrical terminals connected to one or more electrical cables; an inner module frame in which the plurality of terminal modules is secured; and a female outer housing having a plurality of cantilevered locking arms with primary surfaces and secondary surfaces on inner sides of the locking arms configured to secure the inner module frame to the female outer housing. Latch surfaces of the inner module frame engage the primary surfaces when the inner module frame is inserted within the female outer housing. The female outer housing is configured to receive a header having side walls surrounding a plurality of mating electrical terminals. The locking arms define ramp features on outer sides of the locking arms configured to push the locking arms inwardly when the side walls contact the ramp features of the locking arms as the header is inserted within the outer housing, thereby engaging the secondary surfaces with the latch surfaces.

In some aspects of the connector assembly described in the preceding paragraph, the secondary surfaces are arranged closer to free ends of the locking arms than the primary surfaces.

In some aspects of the connector assembly described in any one of the preceding paragraphs, the latch surfaces are substantially parallel to the primary surfaces and nonparallel to the secondary surfaces.

In some aspects of the connector assembly described in any one of the preceding paragraphs, the secondary surfaces are nonparallel with the primary surfaces.

In some aspects of the connector assembly described in any one the preceding paragraphs, a first force applied to the latch surfaces when the primary surfaces engage the latch surfaces is less than a second force applied to the latch surfaces when the secondary surfaces engage the latch surfaces.

In some aspects of the connector assembly described in any one of the preceding paragraphs, a magnitude of the first force is zero.

In some aspects of the connector assembly described in any one the preceding paragraphs, the secondary surfaces are angled and configured to provide the second force on the latch surfaces due to a wedging interface between the secondary surfaces and edges of the latch surfaces when the side walls of the header are in contact with the ramp features.

In some aspects of the connector assembly described in any one of the preceding paragraphs, a first clearance distance between the primary surfaces and the latch surfaces when the side walls of the header are not in contact with the ramp features is greater than a second clearance distance between the secondary surfaces and the latch surfaces when the side walls of the header are in contact with the ramp features.

In some aspects of the connector assembly described in any one of the preceding paragraphs, the second clearance distance is less than 0.1 mm when the side walls are in contact with the ramp features.

In some aspects of the connector assembly described in any one of the preceding paragraphs, the second clearance distance is 0 mm when the side walls are in contact with the ramp features.

According to one or more aspects of the present disclosure, a method of assembling an electrical connector includes:

- inserting one or more electrical terminals connected to one or more electrical cables within a plurality of terminal modules;
- inserting the plurality of terminal modules within an inner module frame;
- securing the inner module frame to a female outer housing via a plurality of cantilevered locking arms having primary surfaces and secondary surfaces on inner sides of the locking arms. Latch surfaces of the inner module frame engage the primary surfaces when the inner module frame is inserted within the outer housing; and
- inserting a header having side walls surrounding a plurality of mating electrical terminals within the outer housing. The locking arms define ramp features on outer sides of the locking arms configured to push the locking arms inwardly when the side walls contact the ramp features of the locking arms as the header is inserted within the outer housing, thereby engaging the secondary surfaces with the latch surfaces of the inner module frame.

In some aspects of the method described in the preceding paragraph, the method further includes applying a first force to the inner module frame via the locking arms when the primary surfaces engage the latch surfaces and applying a second force to the latch surfaces via the locking arms when the secondary surfaces engage the latch surfaces. The first force is less than the second force.

In some aspects of the method described in any one of the preceding paragraphs, the secondary surfaces are angled and configured to provide the second force on the latch surfaces due to a wedging interface between the secondary surfaces and edges of the latch surfaces when the side walls of the header are in contact with the ramp features.

In some aspects of the method described in any one of the preceding paragraphs, the secondary surfaces are angled and provide the second force on the latch surfaces due to a wedging interface between the secondary surfaces and edges of the latch surfaces when the side walls of the header are in contact with the ramp features.

In some aspects of the method described in any one of the preceding paragraphs, a first clearance distance between the primary surfaces and the latch surfaces of the inner module frame when the side walls of the header are not in contact with the ramp features is greater than a second clearance distance between the secondary surfaces and the latch surfaces of the inner module frame when the side walls of the header are in contact with the ramp features.

BRIEF DESCRIPTION OF THE DRAWINGS

The present invention will now be described, by way of example with reference to the accompanying drawings, in which.

DETAILED DESCRIPTION

Figure 1:
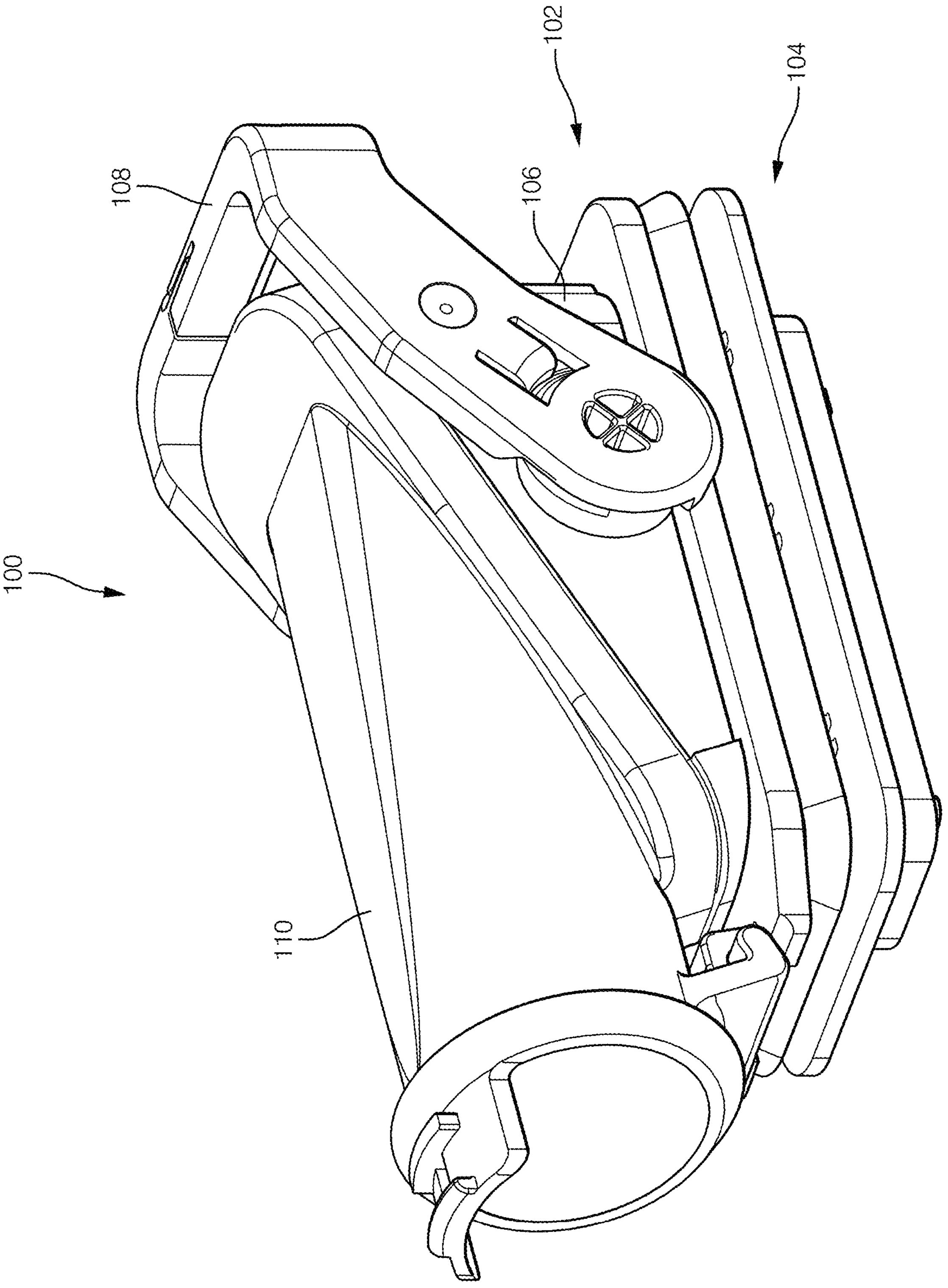
FIG. 1 illustrates an isometric view of an electrical connector assembly according to some embodiments.
Figure 2:
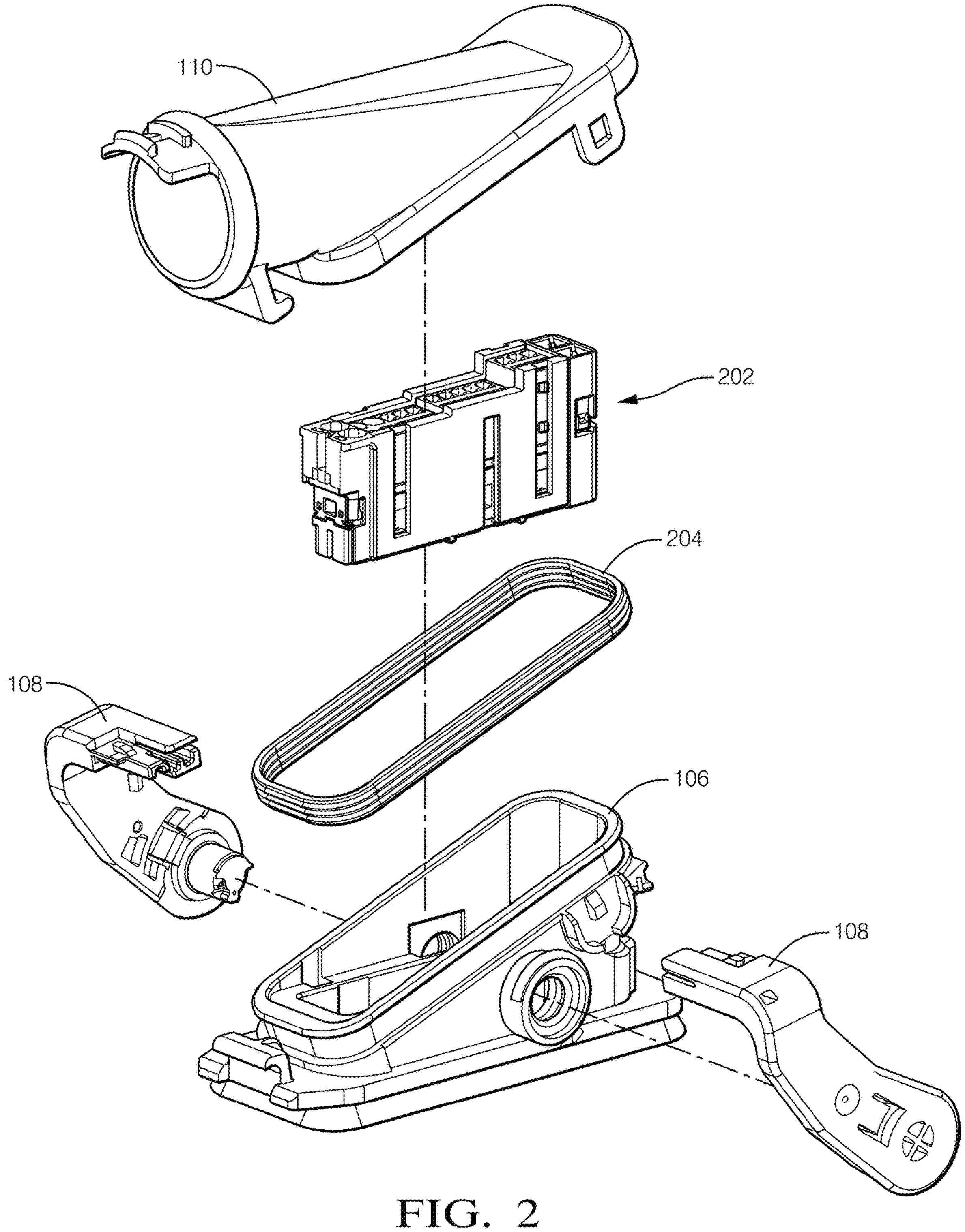
FIG. 2 illustrates an exploded view of the electrical connector assembly of FIG. 1 according to some embodiments.
Figure 4A:
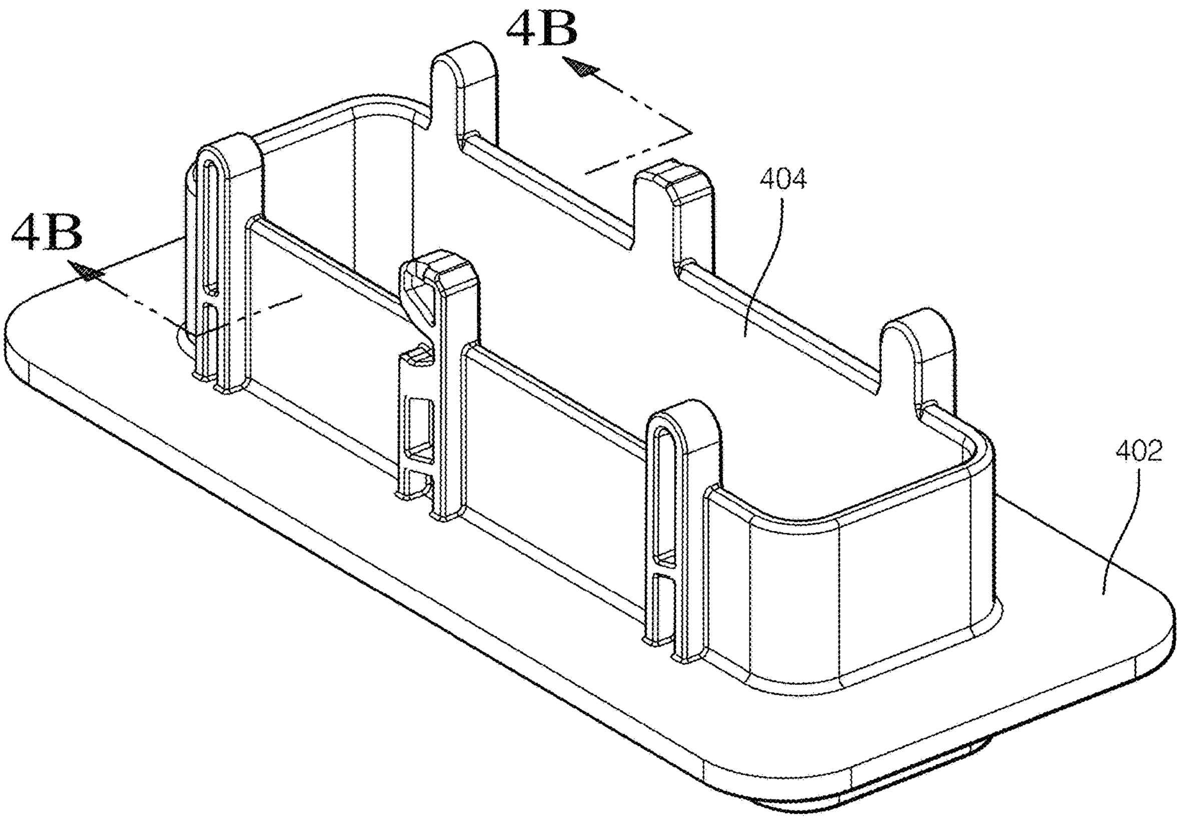
FIG. 4A illustrates an isometric view of a terminal module frame of the electrical connector assembly of FIG. 1 according to some embodiments.

FIGS. 1 and 2 illustrate a non-limiting example of an electrical connector assembly, hereafter referred to as the connector 100. The connector 100 includes a harness connector 102 configured to contain a plurality of electrical terminals terminating electrical cables of a wiring harness as shown in FIG. 4A. Returning to FIG. 1, the connector 100 also includes a header connector 104 containing a plurality of mating electrical terminals. The header connector 104 is configured to be mounted to a panel or bulkhead (not shown).

Returning now to FIGS. 1 and 2, the harness connector 102 includes a female outer housing 106 having a mating assist lever 108. As shown in FIG. 2, the mating assist lever 108 is made of two piece that snap together to simplify the attachment of the mating assist lever 108 to the female outer housing 106. The harness connector 102 also includes a terminal module 202, a wire dress cover 110 configured to arrange the electrical cables of the wiring harness, and a seal 204 between the wire dress cover 110 and the female outer housing 106 to inhibit entry of environmental contaminants, such as dirt, dust, water, and other fluids into the female outer housing 106.

Figure 3A:
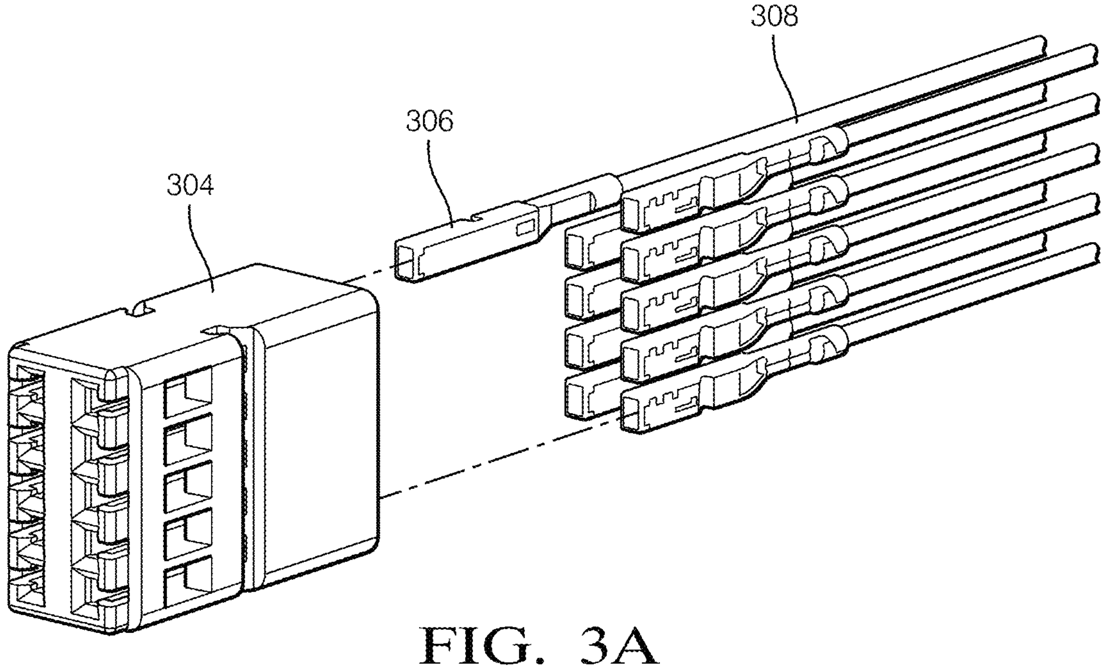
FIG. 3A illustrates an isometric top view of a connector header of the electrical connector assembly of FIG. 1 according to some embodiments.
Figure 3B:
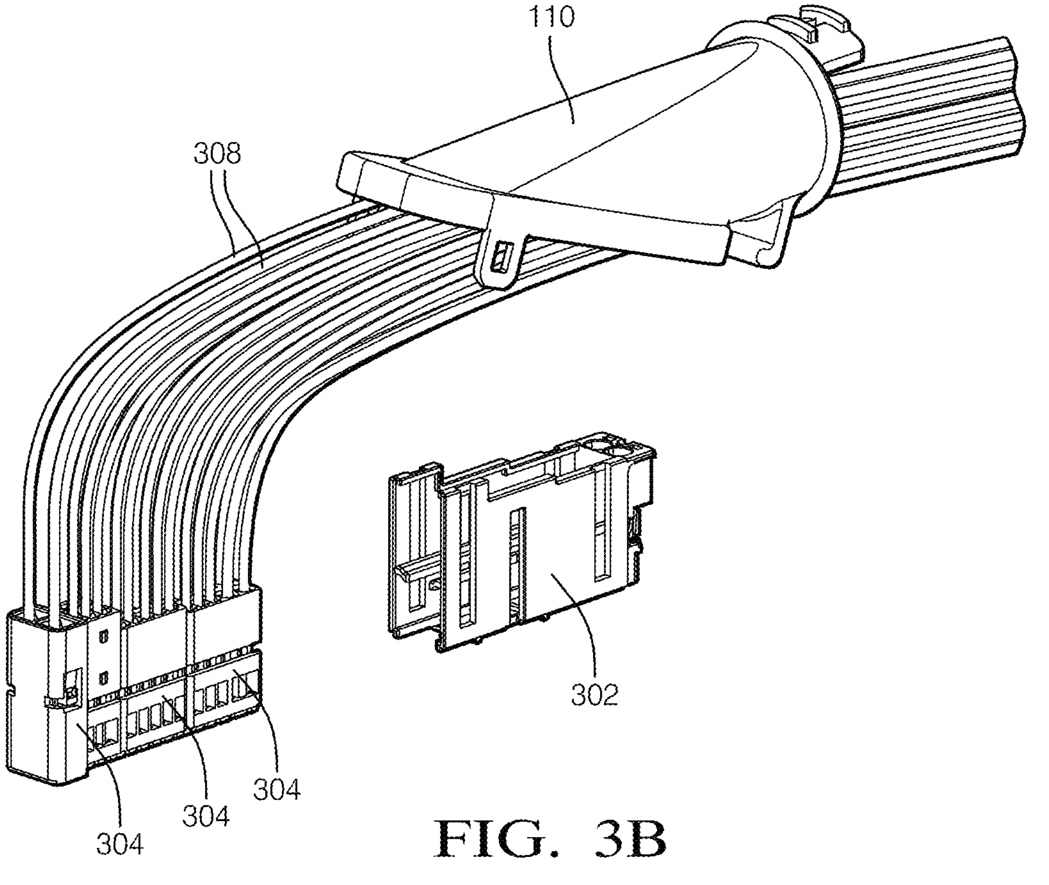
FIG. 3B illustrates a cross-section view of the connector header of FIG. 3A according to some embodiments.

The terminal module 202 includes an inner module frame 302 illustrated in FIGS. 3A and 3B which is configured to retain a number of electrical connector modules 304 containing the electrical terminals 306 connected to the electrical cables 308. The inner module frame 302 also includes its own terminal cavities that are configured to contain coaxial terminals. The terminal module 202 is placed within the female outer housing 106 to retain the terminals 306 within the harness connector 102.

Figure 4B:
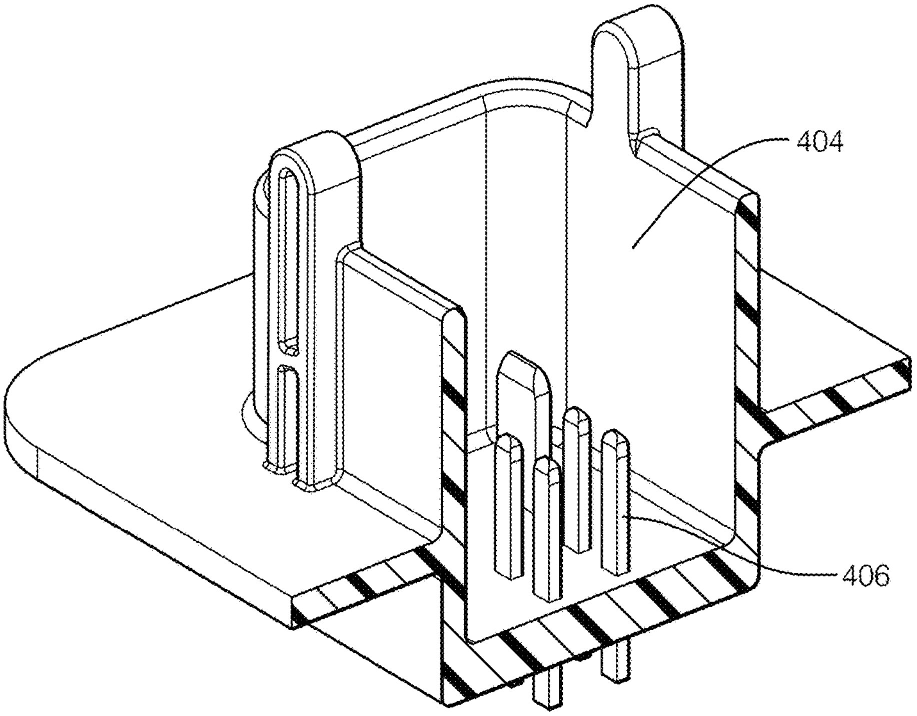
FIG. 4B illustrates an isometric view of an inner terminal module frame of the electrical connector assembly of FIG. 1 according to some embodiments.

As shown in FIGS. 4A and 4B, the header connector 104 includes a shroud 402 having side walls 404 that surround the mating electrical terminals 406. The side walls 404 are received within the harness connector 102. The mating assist lever 108 is configured to help overcome the mechanical resistance of mating the plurality of electrical terminals 306 in the harness connector 102 to the plurality of mating electrical terminals 406 in the header connector 104.

Figure 5:
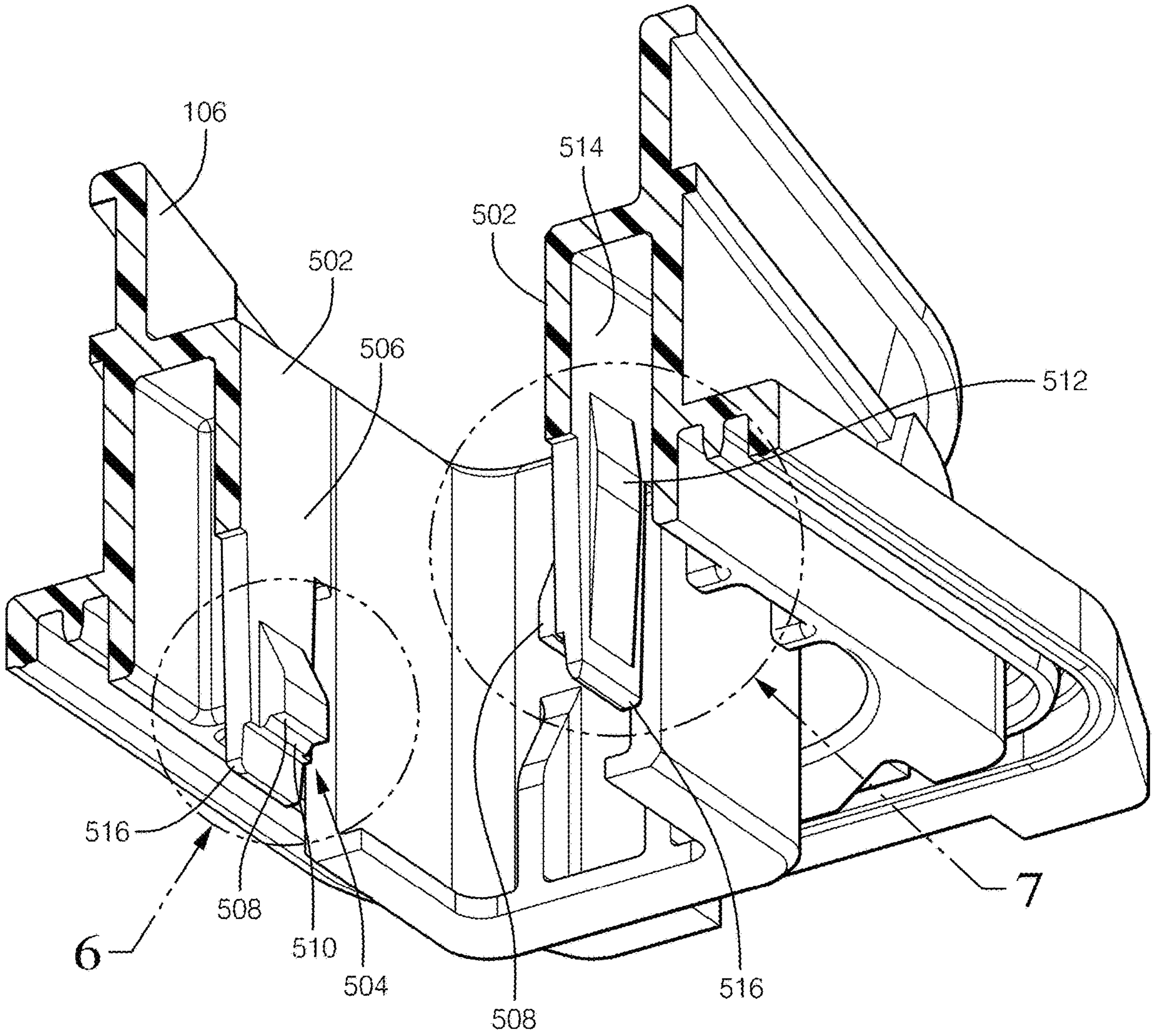
FIG. 5 illustrates a cross section view of an outer connector housing according to some embodiments.
Figure 6:
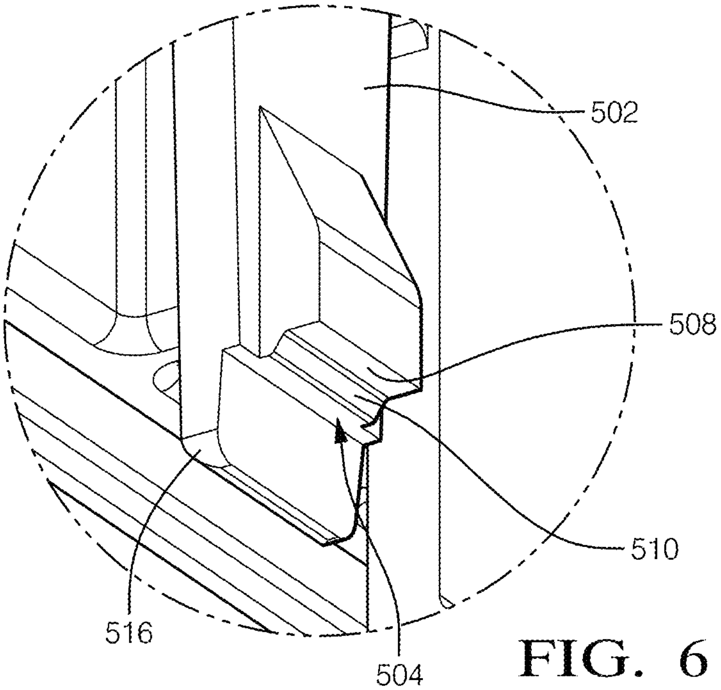
FIG. 6 illustrates a close-up view of a front face of a flexible locking arm of the outer connector housing of FIG. 5 according to some embodiments.
Figure 7:
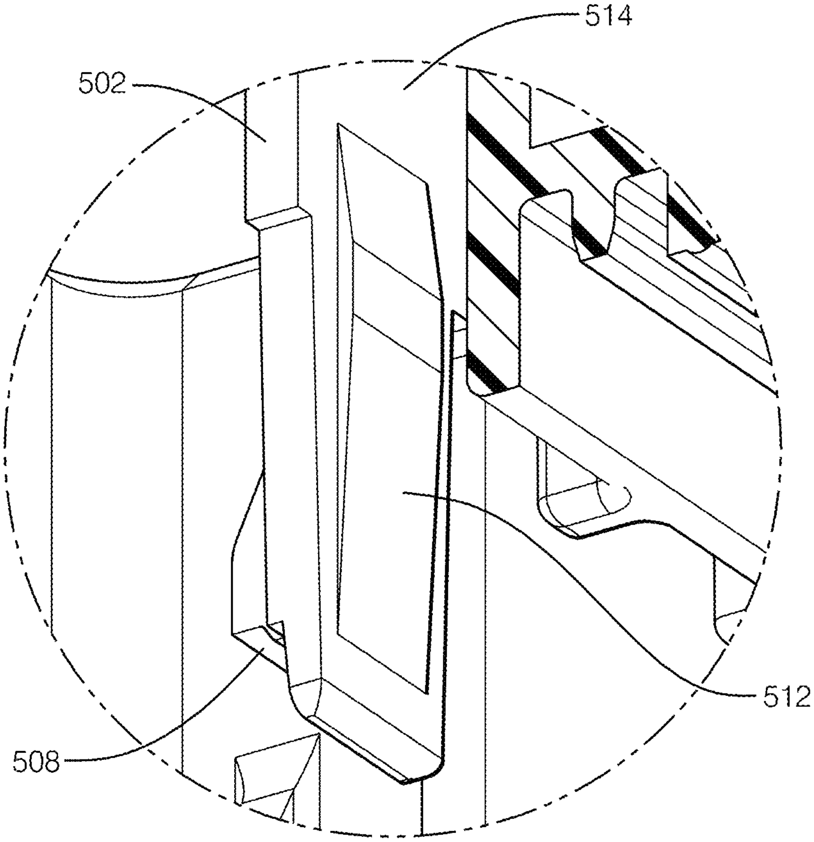
FIG. 7 illustrates a close-up view of a rear face of a flexible locking arm of the outer connector housing of FIG. 5 according to some embodiments.

As shown in FIG. 5, the female outer housing 106 defines a number of cantilevered flexible locking arms 502 that hold the terminal module 202 within the female outer housing 106. As best shown in FIG. 6, stop faces 504 on inner surfaces 506 of each flexible locking arm 502 is separated into a primary surface 508 and a secondary surface 510. As best shown in FIG. 7, the flexible locking arms 502 also each have an outer wedge shaped ramp feature 512 on their outer surface 514. The secondary surfaces 510 are located at the ends of the locking arms 502, i.e., the secondary surfaces 510 are arranged closer to the free ends 516 of the locking arms 502 than the primary surfaces 508.

Figure 8:
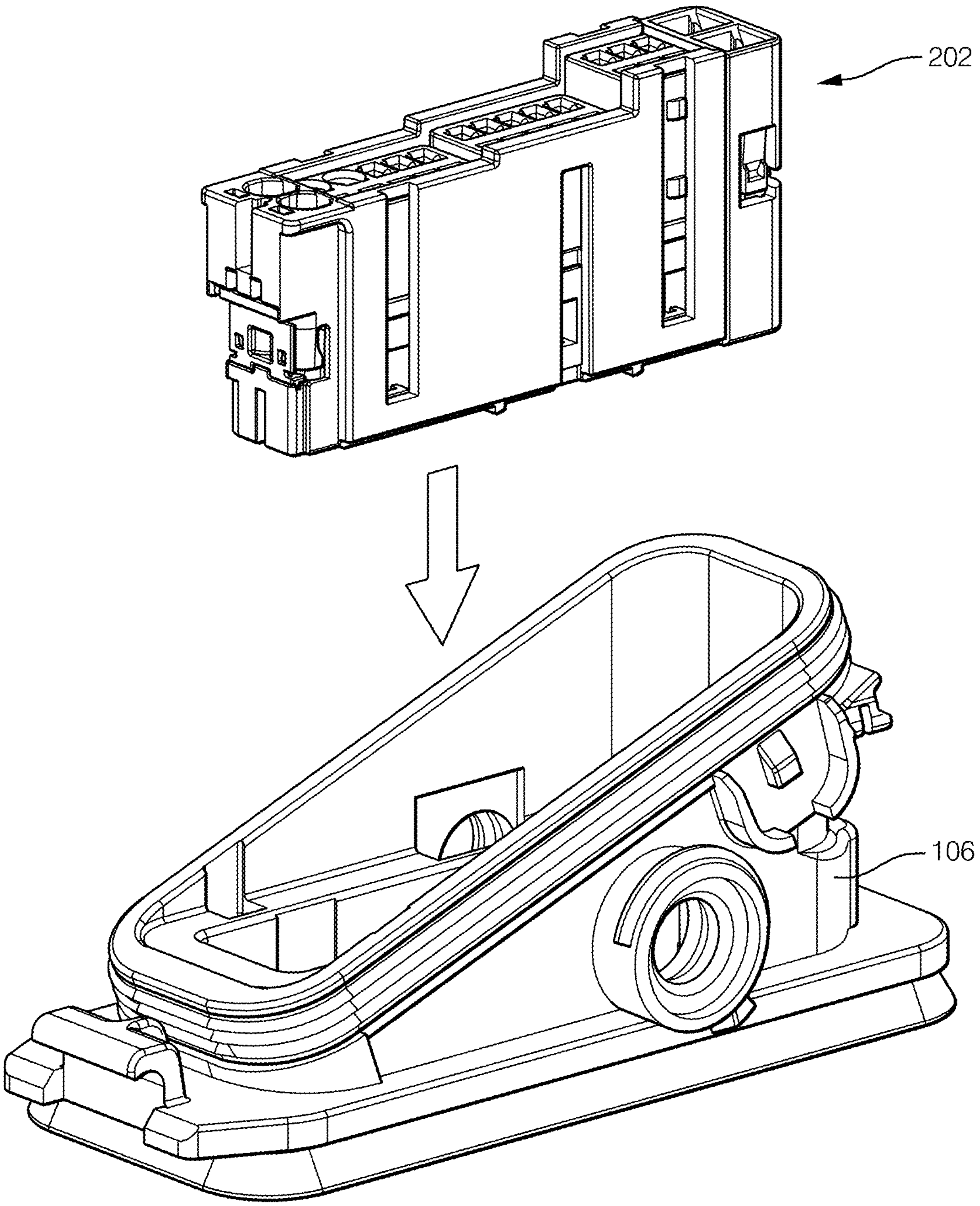
FIG. 8 illustrates an isometric view of the inner terminal module frame of FIG. 4B containing as plurality of terminal modules being inserted into the outer connector housing of FIG. 5 according to some embodiments.
Figure 9:
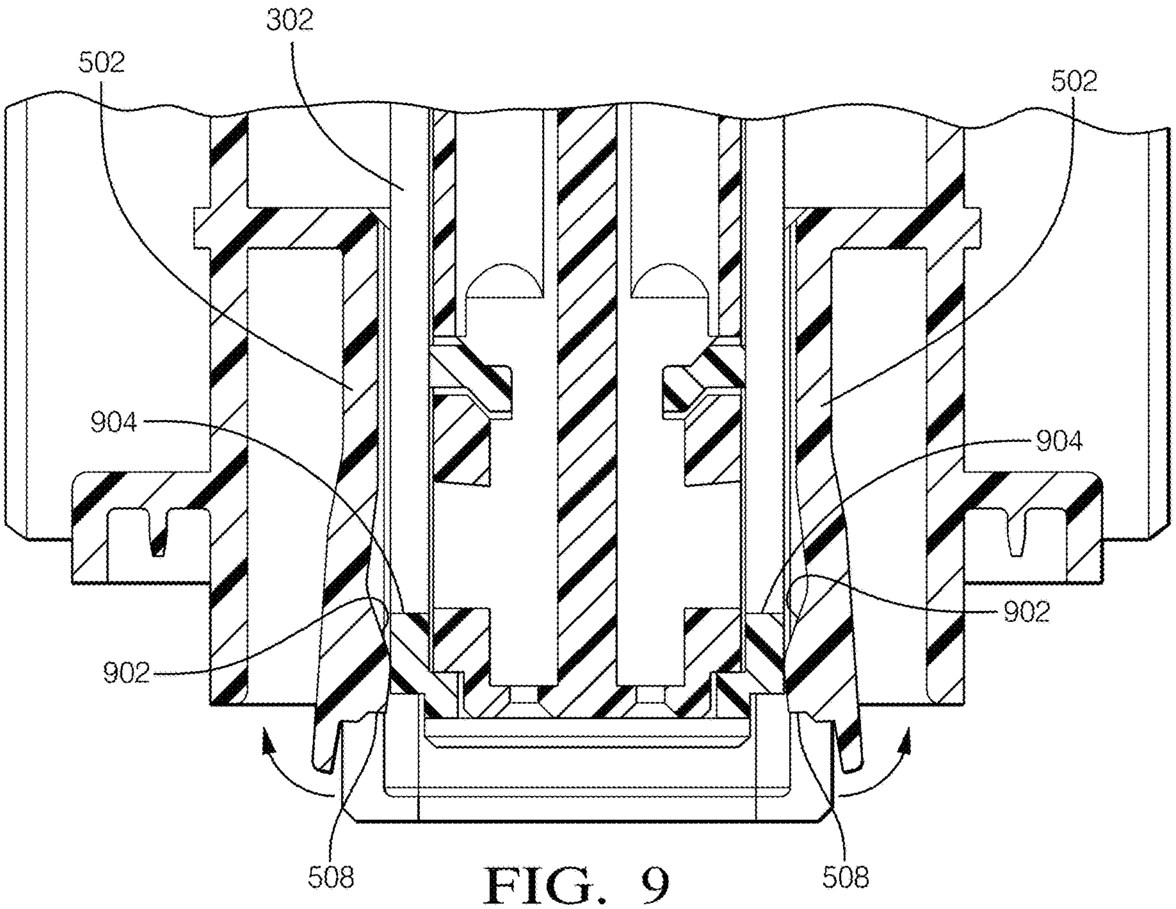
FIG. 9 illustrates a cross section view of the inner terminal module frame of FIG. 4B being inserted into the outer connector housing of FIG. 5 according to some embodiments.

As illustrated in FIG. 8, the terminal module 202 is axially inserted into the female outer housing 106. When the terminal module 202 is inserted into female outer housing (before header connector 104 engagement) as shown in FIG. 9, the inner module frame 302 contacts an inner ramp feature 902 on their outer surface 514 on the inner surfaces 506 of the flexible locking arms 502 and pushes the flexible locking arms 502 outwardly until a latch surface 904 on the inner module frame clear the stop faces 504.

Figure 10:
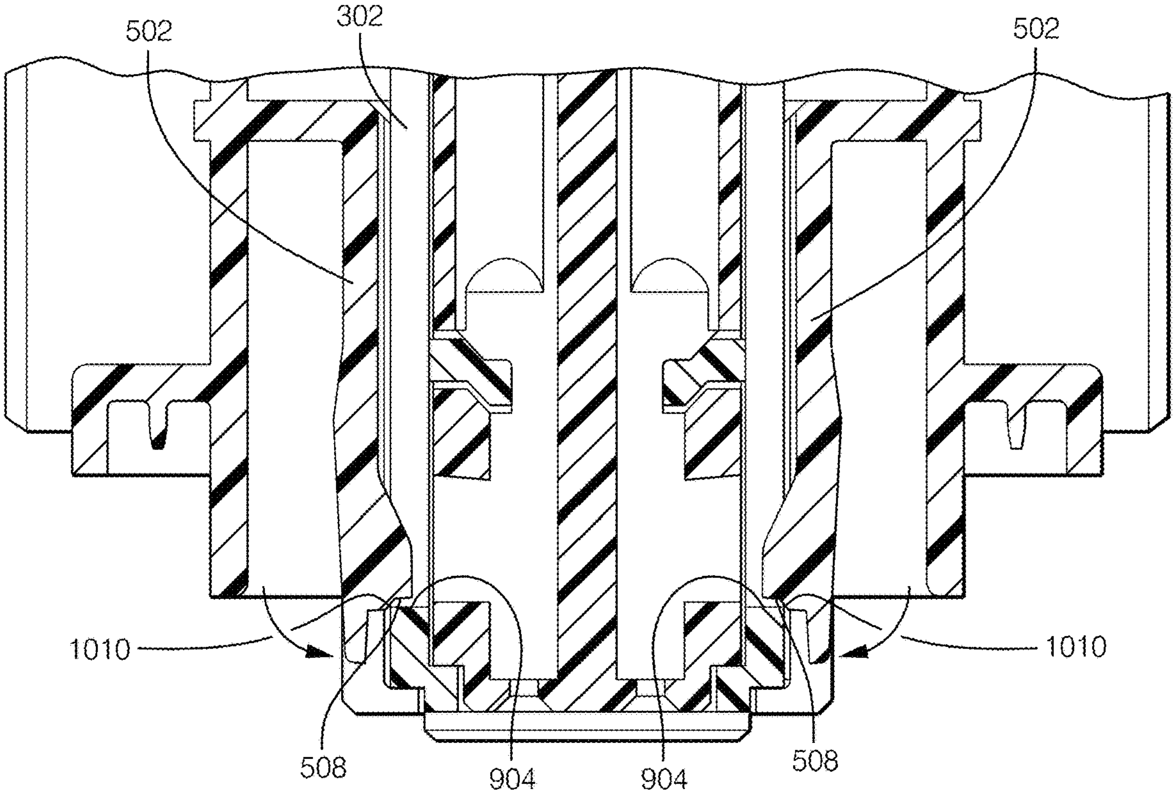
FIG. 10 illustrates a cross section view of the inner terminal module frame of FIG. 4B fully inserted into the outer connector housing of FIG. 5 according to some embodiments.
Figure 11:
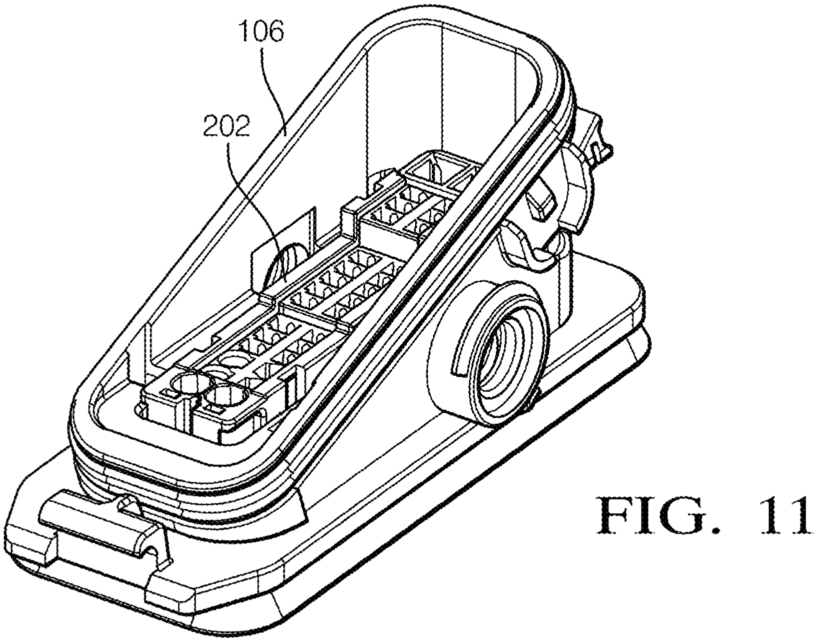
FIG. 11 illustrates an isometric view of an outer housing subassembly containing the inner terminal module frame of FIG. 4B fully inserted into the outer connector housing of FIG. 5 according to some embodiments.
Figure 12:
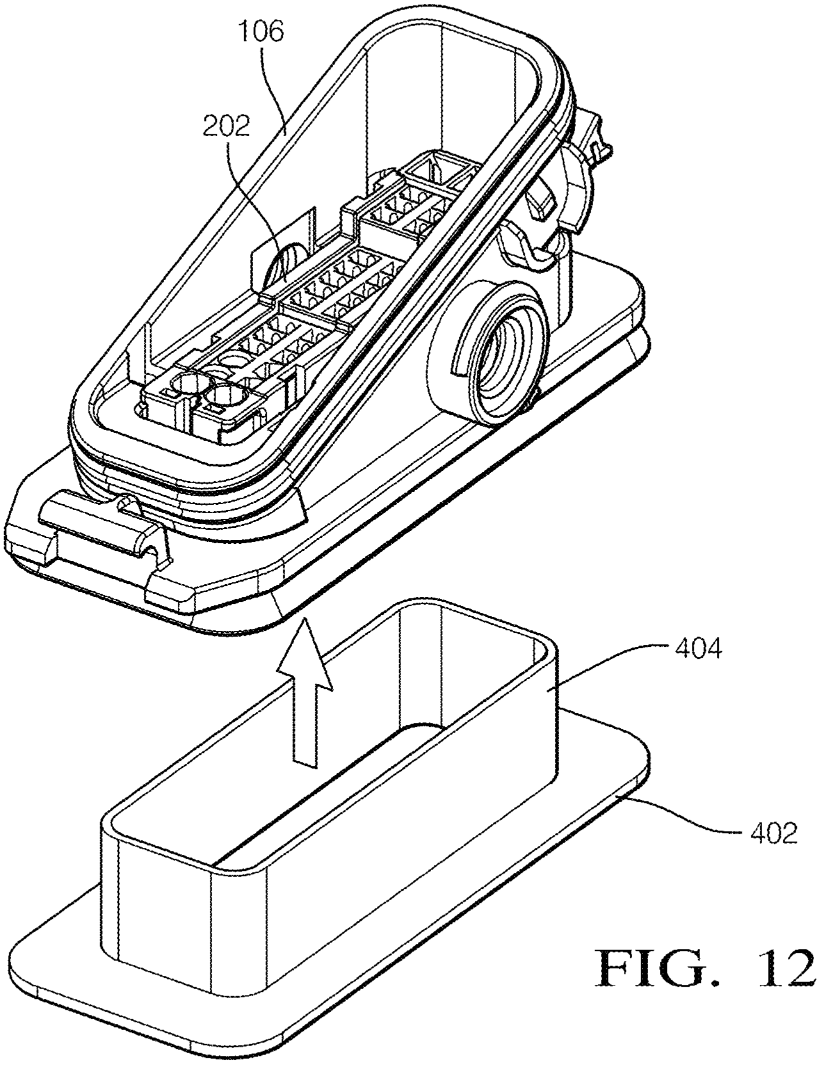
FIG. 12 illustrates an isometric view of the connector header of FIG. 3A being inserted into the outer connector subassembly of FIG. 11 according to some embodiments.
Figure 13:
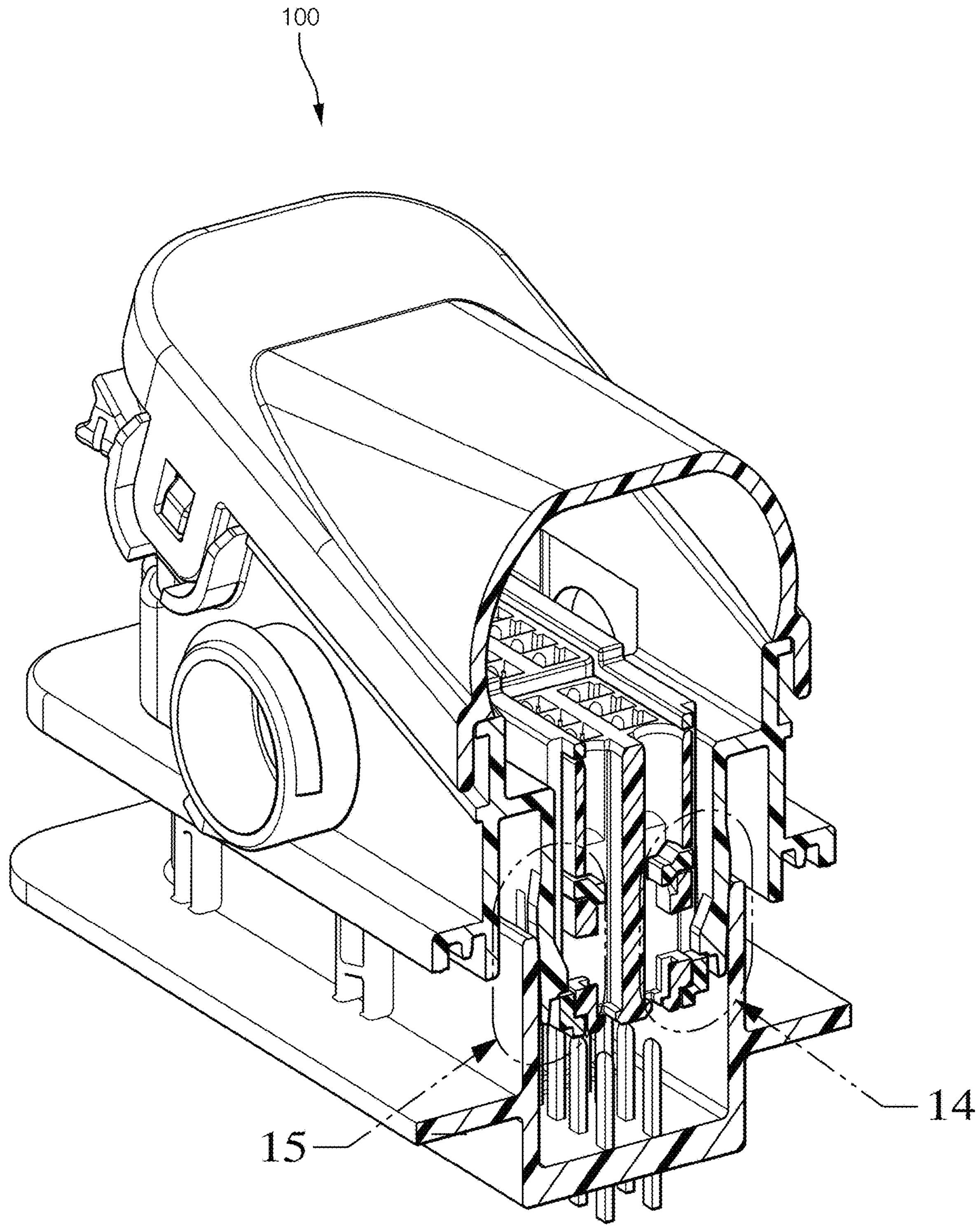
FIG. 13 illustrates a cross section view of the connector header of FIG. 3A as the connector header is being inserted into the outer connector subassembly of FIG. 11 according to some embodiments.
Figure 14:
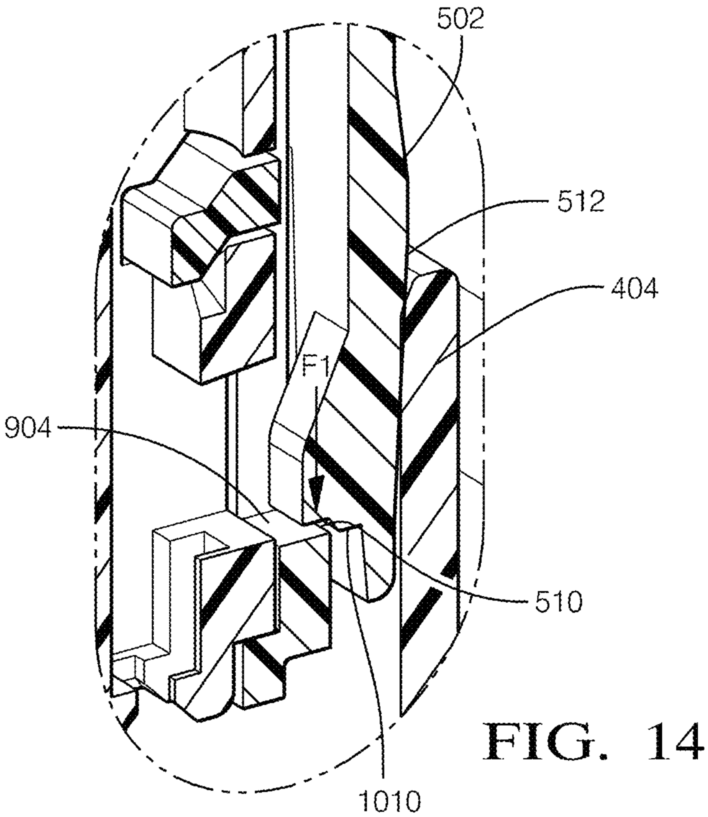
FIG. 14 illustrates a close-up view of the front face of a flexible locking arm of FIG. 5 interfacing with the inner terminal module frame of FIG. 4B as the connector header is being inserted into the outer connector subassembly according to some embodiments.
Figure 15:
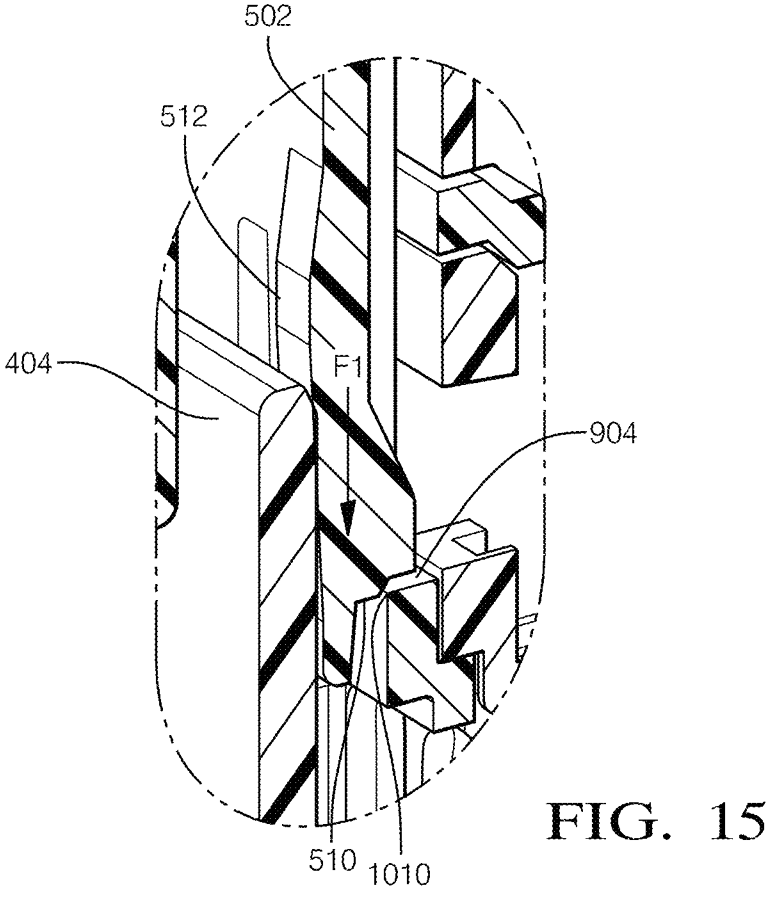
FIG. 15 illustrates a close-up view of the rear face of a flexible locking arm of FIG. 5 interfacing with a shroud wall of the connector header of FIG. 3A as the connector header is being inserted into the outer connector subassembly according to some embodiments.
Figure 16:
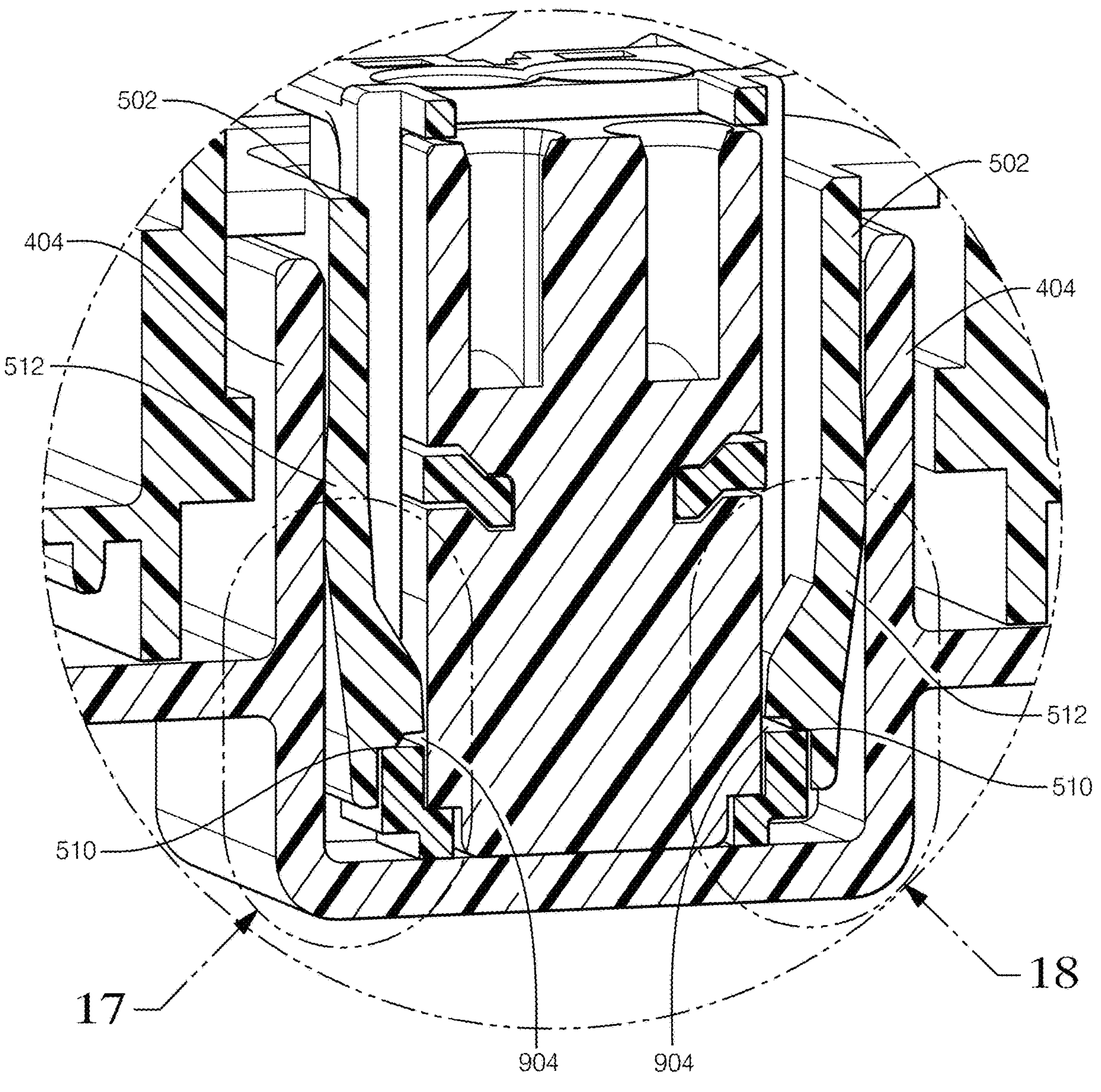
FIG. 16 illustrates a cross section view of the connector header of FIG. 3A after the connector header is fully inserted into the outer connector subassembly of FIG. 11 according to some embodiments.
Figure 17:
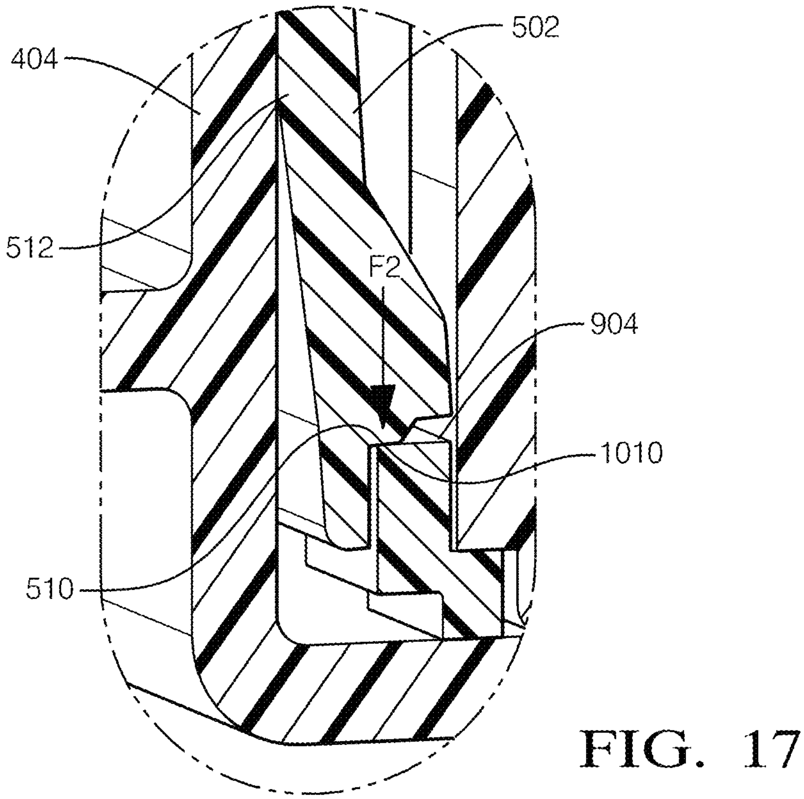
FIG. 17 illustrates a close-up view of the front face of a flexible locking arm of FIG. 5 interfacing with the inner terminal module frame of FIG. 4B after the connector header is fully inserted into the outer connector subassembly according to some embodiments.
Figure 18:
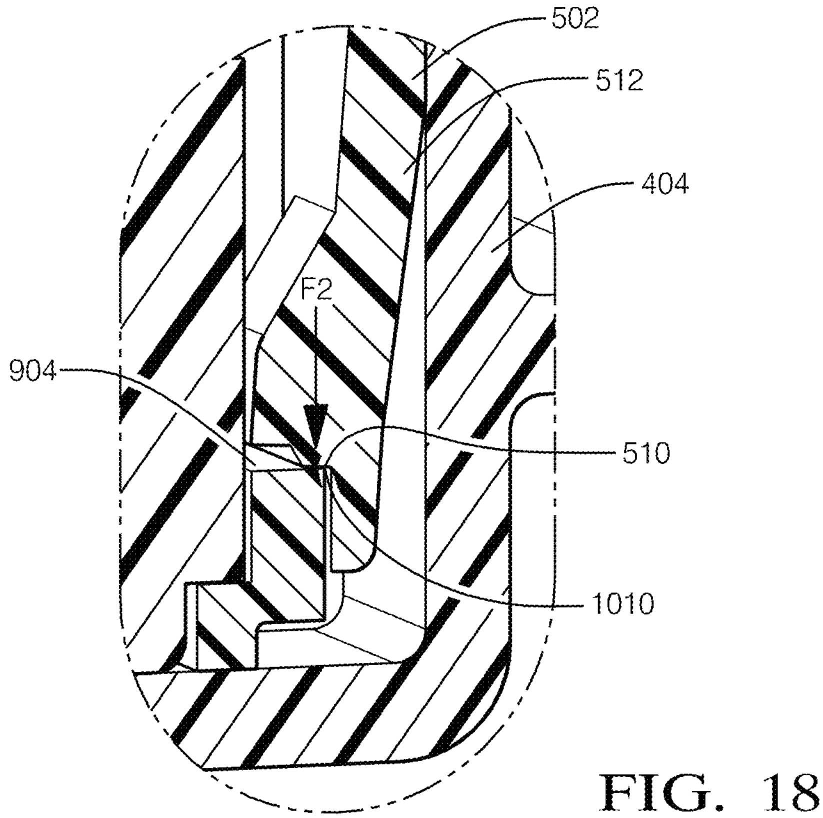
FIG. 18 illustrates a close-up view of the rear face of a flexible locking arm of FIG. 5 interfacing with a shroud wall of the connector header of FIG. 3A after the connector header is fully inserted into the outer connector subassembly according to some embodiments.

As illustrated in FIG. 10, the primary surface 508 of the stop face 504 of each flexible locking arm 502 contacts an edge 1010 of the latch surface 904 on the inner module frame 302 and the primary surfaces 508 and apply a first force F1 to the inner module frame 302 that holds the terminal module 202 within the female outer housing as shown in FIG. 11. The primary surfaces 510 are arranged substantially parallel to the latch surfaces 904. and the secondary surfaces are nonparallel to both the first surfaces and the latch surfaces.

As the header connector 104 is inserted to the female outer housing as shown in FIGS. 12 through 19, the side walls 404 of the shroud 402 contact the outer wedge shaped ramp feature 512 and push the flexible locking arms 502 inwardly so that the angled secondary surface 510 of the stop face 504 of each flexible locking arm 502, rather than the primary surface 508, contacts the latch surface 904 on the inner module frame 302. The secondary surfaces 510 are nonparallel to both the primary surfaces 508 and the latch surfaces 904. The angled secondary surface 510 acts as a wedge and applies a second force F2 that pushes the inner module frame 302 toward the header connector 104, thereby increasing the terminal overlap of the terminals 306 and the mating terminals 406 and reducing the likelihood of relative movement between the terminals 306 and the mating terminals 406 caused by vibration that may degrade the electrical performance of the connector 100.

The second force F2 is greater than the first force F1. The first force F1 may have zero magnitude.

There may be a first clearance distance between the primary surfaces 508 and the latch surfaces 904 when the side walls 404 of the shroud 402 are not in contact with the outer wedge shaped ramp features 512. This first clearance distance is greater than a second clearance distance between the secondary surfaces 510 and the latch surfaces 904 when the side walls 404 of the shroud 402 are in contact with the outer wedge shaped ramp feature 512. The second clearance distance may be less than 0.1 mm when the side walls 404 are in contact with the outer wedge shaped ramp feature 512 and is preferably 0 mm, meaning there is no clearance between the secondary surfaces 510 and the latch surfaces 904.

Figure 19:
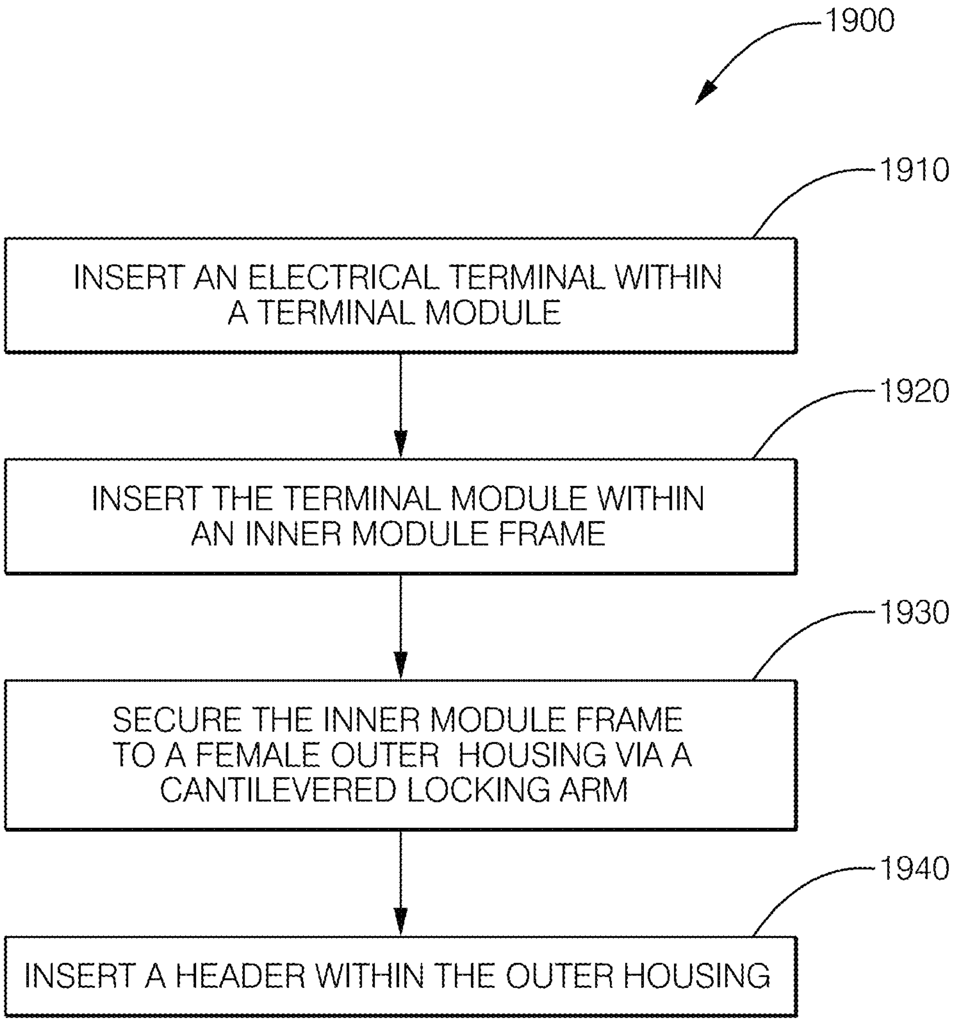
FIG. 19 is a flow chart of a method of assembling and electrical connector according to some embodiments.

FIG. 19 is a flowchart of an example method 1900 for assembling an electrical connector 100, comprising the steps of:

STEP 1910, INSERT AN ELECTRICAL TERMINAL WITHIN A TERMINAL MODULE, includes inserting one or more electrical terminals 306 connected to one or more electrical cables within a plurality of terminal modules 304;

STEP 1920, INSERT THE TERMINAL MODULE WITHIN AN INNER MODULE FRAME, includes inserting the plurality of terminal modules 304 within an inner module frame 302;

STEP 1930, SECURE THE INNER MODULE FRAME TO A FEMALE OUTER HOUSING VIA A CANTILEVERED LOCKING ARM, includes securing the inner module frame 302 to a female outer housing 106 via a plurality of cantilevered locking arms 502 having primary surfaces 508 and secondary surfaces 510 on inner surfaces 506 of the locking arms 502. Latch surfaces 904 on the inner module frame 302 engage the primary surfaces 508 when the inner module frame 302 is inserted within the female outer housing 106; and STEP 1940, INSERT A HEADER WITHIN THE OUTER HOUSING, includes inserting a shroud 402 of a header connector 104 having side walls 404 surrounding a plurality of mating electrical terminals 406 within the female outer housing 106. The locking arms 502 define ramp features 512 on their outer surfaces 514 that are configured to push the locking arms 502 inwardly when the side walls 404 contact the ramp features 512 of the locking arms 502 as the shroud 402 is inserted within the female outer housing 106, thereby engaging the secondary surfaces 510 with the latch surfaces 904 of the inner module frame 302.

The connector 100 provides at least following benefits:

A reduction of the package size of the connector because the assembly process of inserting the inner module frame into the female outer housing may be accomplished using only axial movement of the inner module frame relative to the female outer housing;

An improvement is terminal overlap distance between the terminals and the mating terminals due to the stepped primary and secondary surfaces on the flexible locking arm; and Reinforcement of the flexible locking arms by the male header shroud resulting in improved retention force of the inner module frame within the female outer housing.

While the example presented herein is directed to an electrical connector assembly, alternative embodiments of the connector assembly may be envisioned that are configured to interconnect fiber optic cables, pneumatic tubes, hydraulic tubes, or a hybrid connector assembly having a combination of any of these types of conductors.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an”, and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

a plurality of terminal modules, each configured to contain one or more electrical terminals connected to one or more electrical cables;

an inner module frame in which the plurality of terminal modules is secured; and a female outer housing having a plurality of cantilevered locking arms with primary surfaces and secondary surfaces on inner sides of the locking arms configured to secure the inner module frame to the female outer housing, wherein latch surfaces of the inner module frame engage the primary surfaces when the inner module frame is inserted within the female outer housing, wherein the female outer housing is configured to receive a header having side walls surrounding a plurality of mating electrical terminals, wherein the locking arms define ramp features on outer sides of the locking arms configured to push the locking arms inwardly when the side walls contact the ramp features of the locking arms as the header is inserted within the outer housing, thereby engaging the secondary surfaces with the latch surfaces.

2. The electrical connector assembly according to claim 1, wherein the secondary surfaces are arranged closer to free ends of the locking arms than the primary surfaces.

3. The electrical connector assembly according to claim 1, wherein the latch surfaces are substantially parallel to the primary surfaces and nonparallel to the secondary surfaces.

4. The electrical connector assembly according to claim 1, wherein the secondary surfaces are nonparallel with the primary surfaces.

5. The electrical connector assembly according to claim 1, wherein a first force applied to the latch surfaces when the primary surfaces engage the latch surfaces is less than a second force applied to the latch surfaces when the secondary surfaces engage the latch surfaces.

6. The electrical connector assembly according to claim 5, wherein a magnitude of the first force is zero.

7. The electrical connector assembly according to claim 5, wherein the secondary surfaces are angled and configured to provide the second force on the latch surfaces due to a wedging interface between the secondary surfaces and edges of the latch surfaces when the side walls of the header are in contact with the ramp features.

8. The electrical connector assembly according to claim 5, wherein a first clearance distance between the primary surfaces and the latch surfaces when the side walls of the header are not in contact with the ramp features is greater than a second clearance distance between the secondary surfaces and the latch surfaces when the side walls of the header are in contact with the ramp features.

9. The electrical connector assembly according to claim 8, wherein the second clearance distance is less than 0.1 mm when the side walls are in contact with the ramp features.

10. The electrical connector assembly according to claim 9, wherein the second clearance distance is 0 mm when the side walls are in contact with the ramp features.

11. A method of assembling an electrical connector, comprising:

inserting one or more electrical terminals connected to one or more electrical cables within a plurality of terminal modules;

inserting the plurality of terminal modules within an inner module frame;

securing the inner module frame to a female outer housing via a plurality of cantilevered locking arms having primary surfaces and secondary surfaces on inner sides of the locking arms, wherein latch surfaces of the inner module frame engage the primary surfaces when the inner module frame is inserted within the outer housing; and inserting a header having side walls surrounding a plurality of mating electrical terminals within the outer housing, wherein the locking arms define ramp features on outer sides of the locking arms configured to push the locking arms inwardly when the side walls contact the ramp features of the locking arms as the header is inserted within the outer housing, thereby engaging the secondary surfaces with the latch surfaces of the inner module frame.

12. The method according to claim 11, further comprising:

applying a first force to the inner module frame via the locking arms when the primary surfaces engage the latch surfaces; and applying a second force to the latch surfaces via the locking arms when the secondary surfaces engage the latch surfaces, wherein the first force is less than the second force.

13. The method according to claim 12, wherein the secondary surfaces are angled and configured to provide the second force on the latch surfaces due to a wedging interface between the secondary surfaces and edges of the latch surfaces when the side walls of the header are in contact with the ramp features.

14. The method according to claim 12, wherein the secondary surfaces are angled and provide the second force on the latch surfaces due to a wedging interface between the secondary surfaces and edges of the latch surfaces when the side walls of the header are in contact with the ramp features.

15. The method according to claim 12, wherein a first clearance distance between the primary surfaces and the latch surfaces of the inner module frame when the side walls of the header are not in contact with the ramp features is greater than a second clearance distance between the secondary surfaces and the latch surfaces of the inner module frame when the side walls of the header are in contact with the ramp features.

* * * * *